Oct. 10, 1933.  V. G. APPLE  1,930,032
BRAKE OPERATING MECHANISM
Filed Jan. 13, 1930
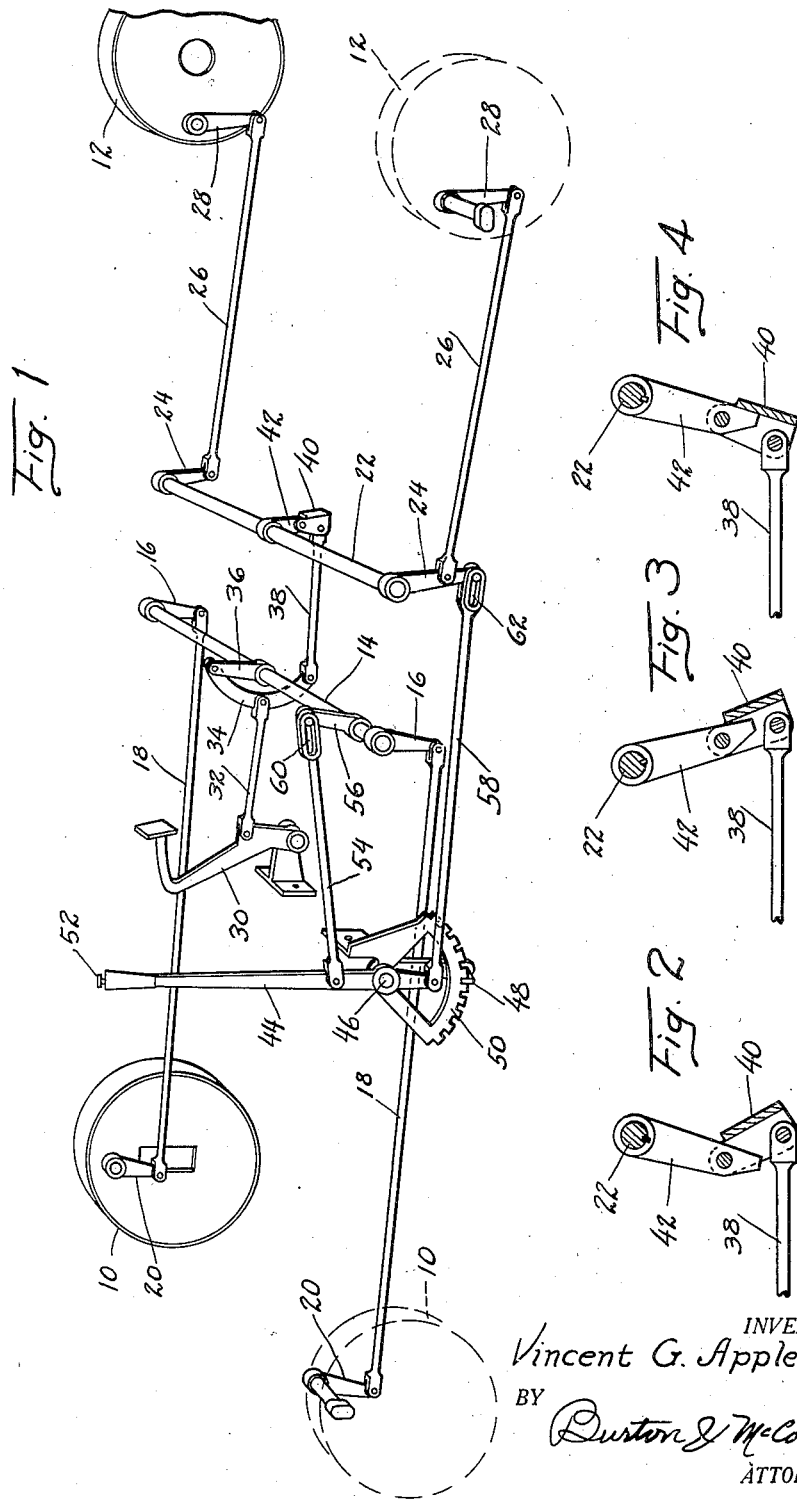
INVENTOR.
Vincent G. Apple
BY
Durston & McConkey
ATTORNEYS

UNITED STATES PATENT OFFICE 1,930,032

BRAKE OPERATING MECHANISM

Vincent G. Apple, Dayton, Ohio, assignor to Bendix Brake Company, South Bend, Ind., a corporation of Illinois Application January 13, 1930. Serial No. 420,374

11 Claims. (Cl. 188—106)

My invention relates to improvements in brake operating mechanism and particularly to brake operating mechanisms applied to a motor vehicle arranged to be actuated by two independently manipulable operating members such as a pedal and a hand lever.

One object of my invention is to provide operating mechanism for a plurality of brakes or sets of brakes including two independently manipulable operating members, whereby both sets of brakes may be applied simultaneously by actuation of one operating member, and each set of brakes may be applied independently of the other through actuation of the proper operating member.

An object of importance, in mechanism of this character, is the provision of connections extending between two operating members and two sets of brakes whereby the brakes are operable by either operating member independently of the other and without affecting the other and whereby one operating member when actuated applies all the brakes and the other operating member applies the brakes selectively.

A meritorious feature comprises the employment of means whereby the operating member which serves to apply the brakes selectively is moved in one direction to apply one set of brakes and in another and preferably the opposite direction to apply the other set of brakes. Lost motion connections are also provided in a hook-up of this type whereby each of two brake shafts may be selectively operated by one operating member and said shafts may be simultaneously operated by another operating member without affecting the first operating member.

Other objects and meritorious features of my invention will more fully appear in the following specification, appended claims, and accompanying drawing wherein:

Fig. 1 is a diagrammatical perspective of a brake hook-up embodying my invention, and Figs. 2, 3, and 4 illustrate different positions of the overrunning connection between the foot pedal equalizer and rear cross brake shaft.

In the figures of the drawing my invention is embodied in a brake hook-up shown in Fig. 1 wherein a motor vehicle brake system is diagrammatically illustrated in which front wheel brakes are indicated as 10 and rear wheel brakes as 12. A cross brake shaft 14 is connected with the front brakes by lever arms 16, tension connections 18, and lever arms 20. A cross brake shaft 22 is connected with the rear brakes through lever arms 24, tension connections 26, and lever arms 28. The brakes may be of any suitable conventional variety.

Means are provided through the employment of two independently manipulable members to rotate the brake shafts 14 and 22 selectively or simultaneously to apply the brakes simultaneously or to apply the front brakes independently of the rear brakes or vice versa.

The two manipulable operating members here shown are the brake pedal and hand lever commonly employed. The brake pedal is indicated as 30 and is connected by a tension link 32 to an equalizing bar 34 which is pivoted at its upper end to an arm 36 mounted on the cross shaft 14 and at its lower end through a link 38 and overrunning connection 40 to an arm 42 mounted on the cross shaft 22 whereby depression of the pedal rotates brake shafts 14 and 22 with equal torque.

The hand lever 44 is pivoted at 46 and has its lower end provided with a lock structure 48 engagable in a notched quadrant 50 and manipulable through employment of an operating rod 52 in a well known manner to hold the lever at adjusted positions. The lever is shown in the neutral position. A tension link 54 connects the lever through an arm 56 with the shaft 14 and a tension link 58 connects the lever through one of the arms 24 with the shaft 22. The tension link 54 is slotted as at 60 so that the connection with the arm 56 is a lost motion connection and the tension link 58 is similarly slotted at 62 so that the connection with the arm 24 is also a lost motion connection.

It will be seen that as the hand lever is moved forwardly the shaft 14 is rocked to apply the front wheel brakes through tension transmitted by the rods 18 but that the cross shaft 22 is not rotated due to the lost motion connection of the tension link 58 with the arm 24. It will appear that the arm 24 to which the link 58 is coupled has an extension whereby such link may engage its outer end as shown in the drawing and that as the hand lever is pulled rearwardly the cross shaft 22 will be rotated to apply the rear wheel brakes through tension transmitted by the links 26 but that the cross shaft 14 will not be actuated. Actuation of the brakes whether front or rear by the hand lever will not affect the brake pedal because of the overrunning connections of the hand lever with the shafts 14 and 22 and because of the overrunning connection of the link 38 with the arm 42 through the member 40.

Depression of the pedal 30 rotates both brake shafts equally and applies all the brakes but does not affect the position of the hand lever due to the lost motion connections of the links 54 and 58 with the shafts 14 and 22. After the shaft 22 is actuated by the hand lever the arm 42 will swing forwardly as shown in Fig. 2 and the link 38 will not be acted upon to affect the position of the pedal. In Figs. 3 and 4 respectively the arm 42 and connection 40 and link 38 are shown in the positions they would occupy normally and when torque is being transmitted to the shaft 22 through depression of the pedal.

What I claim:

1. A vehicle brake mechanism comprising, in combination, two sets of brakes, rigid brake operating mechanism disconnectedly coupled therewith to apply the brakes including two manually operable members, one of said members operable to apply both sets of brakes simultaneously, the other member operable to apply either set of brakes selectively.

2. A vehicle brake mechanism comprising, in combination, two sets of brakes, rigid brake operating mechanism disconnectedly coupled therewith to apply the brakes including two manually operable members, one of said members operable to apply both sets of brakes simultaneously, the other member operable when moved in one direction to apply one set of brakes only and when moved in the opposite direction to apply the other set of brakes only.

3. A vehicle brake mechanism comprising, in combination, two sets of brakes, rigid operating mechanism disconnectedly coupled therewith to apply the brakes including a pedal operable to apply both sets of brakes by the same movement, and a hand lever operable upon one movement to apply one set of brakes and by another movement to apply the other set of brakes.

4. A vehicle brake mechanism comprising, in combination, a set of rear brakes, a set of front brakes, rigid operating mechanism disconnectedly coupled therewith to apply the brakes including a pedal operable to apply both sets of brakes by the same movement, and a hand lever movable in one direction to apply the front set of brakes and in the opposite direction to apply the rear set of brakes.

5. In a vehicle having two sets of brakes a brake shaft connected with each set of brakes, an operating member coupled with both brake shafts to actuate them both to simultaneously apply both sets of brakes, and a second operating member disconnectedly coupled with both brake shafts to actuate them independently to apply the two sets of brakes independently.

6. In a vehicle having two sets of brakes, two brake shafts, tension connections coupling one shaft with one set of brakes, tension connections coupling the other shaft with the other set of brakes, and two manually operable brake applying members, one member coupled with both shafts through an equalizer to actuate both shafts to apply both sets of brakes simultaneously and equally, the other member coupled with each shaft through an overrunning connection permitting actuation of each shaft to apply its set of brakes independently of the other.

7. A vehicle having in combination, front wheel brakes, rear wheel brakes, a brake shaft coupled with the front wheel brakes, a brake shaft coupled with the rear wheel brakes, a brake pedal connected to both shafts to actuate them to apply both sets of brakes simultaneously, and a hand lever connected with each shaft through an overrunning linkage whereby each shaft will be actuated by the hand lever independently of the other to apply its set of brakes.

8. In a vehicle having front and rear wheel brakes, a brake shaft connected by tension connections with the front wheel brakes, a second brake shaft connected by tension connections with the rear wheel brakes, a brake pedal connected with both brake shafts to actuate them to apply both front and rear wheel brakes simultaneously, and a hand lever connected with each brake shaft whereby when the lever is moved forwardly it applies the front wheel brakes, said hand lever connected with each shaft through an overrunning connection whereby each shaft may be rotated to apply its set of brakes independently of the other.

9. In a vehicle having front and rear wheel brakes, a brake shaft connected by tension connections with the front wheel brakes, a second brake shaft connected by tension connections with the rear wheel brakes, a brake pedal connected with both brake shafts to actuate them to apply both front and rear wheel brakes simultaneously, and a hand lever connected with each brake shaft whereby when the lever is moved forwardly it applies the front wheel brakes, said hand lever connected with each shaft through an overrunning connection whereby each shaft may be rotated to apply its set of brakes independently of the other, said pedal coupled with the rear wheel brake shaft through an overrunning connection whereby said shaft may be operated with the hand lever without affecting the pedal.

10. In combination with two sets of brakes, independent rock shafts coupled with each set, equalizing mechanism connecting said shafts through a single pivotal connection and a one way connection, a member operable to actuate said equalizing mechanism in a direction to rotate the rock shafts to apply the brakes, and a second member disconnectedly coupled with each rock shaft operable to apply either set of brakes independently of one another.

11. In combination with brake mechanism, a pair of independently rotatable rock shafts, an arm extending radially from each rock shaft, a manually operable arm pivoted intermediate its ends, a link pivoted to said operating member on opposite sides of its pivot point and a one way connection between each of the links and one of the radially extending arms respectively.

VINCENT G. APPLE.